United States Patent
Koizumi et al.

(10) Patent No.: US 11,030,836 B2
(45) Date of Patent: Jun. 8, 2021

(54) DOOR LOCK SYSTEM AND HANDLE OF DOOR FOR VEHICLE

(71) Applicant: AISIN SEIKI KABUSHIKI KAISHA, Kariya (JP)

(72) Inventors: Takaaki Koizumi, Kariya (JP); Yuki Hayashi, Kariya (JP); Rikako Kotani, Kariya (JP); Takehiro Tabata, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/674,175

(22) Filed: Nov. 5, 2019

(65) Prior Publication Data

US 2020/0160635 A1 May 21, 2020

(30) Foreign Application Priority Data

Nov. 19, 2018 (JP) .............................. JP2018-216817
Dec. 25, 2018 (JP) .............................. JP2018-240513

(51) Int. Cl.
*G07C 9/00* (2020.01)
*B60J 5/04* (2006.01)
*E05B 81/78* (2014.01)

(52) U.S. Cl.
CPC ............ *G07C 9/00309* (2013.01); *B60J 5/04* (2013.01); *E05B 81/78* (2013.01); *G07C 2009/00769* (2013.01); *G07C 2209/64* (2013.01)

(58) Field of Classification Search
CPC ...... G07C 9/00309; G07C 2009/00769; G07C 2209/64; G07C 2009/00388; B60J 5/04; E05B 81/78; E05B 85/16; E05B 81/54; E05B 85/10; G06K 7/10019; G06K 7/10148; G06K 7/10297; G06K 7/10316;
(Continued)

(56) References Cited

U.S. PATENT DOCUMENTS 6,670,883 B1 * 12/2003 Asakura .................. B60R 25/24
307/10.1
2005/0258966 A1 * 11/2005 Quan .................. G06K 7/10356
340/572.7
(Continued)

FOREIGN PATENT DOCUMENTS

JP         H094292 A     1/1997
JP      2012154118 A     8/2012
(Continued)

*Primary Examiner* — Edwin C Holloway, III
(74) *Attorney, Agent, or Firm* — Buchanan Ingersoll & Rooney PC

(57) ABSTRACT

A door lock system includes a first circuit performing a first communication to request a response for determining availability of unlocking a door, a second circuit performing a second communication for determining availability of unlocking the door and transmitting a reception result of the second communication to an outside of the door lock system, and a control circuit controlling operations of the first circuit and the second circuit. The control circuit stops one of the first communication and the second communication from being performed in a case where the other one of the first communication and the second communication is performed.

9 Claims, 6 Drawing Sheets

(58) Field of Classification Search
CPC ........... G06K 7/10336; G06K 7/10346; G06K 7/10356
USPC ...................................................... 340/5.72
See application file for complete search history.

(56) References Cited

U.S. PATENT DOCUMENTS

| | | | | |
|---|---|---|---|---|
| 2006/0165039 | A1* | 7/2006 | Lyon ...................... | G06Q 20/20 370/334 |
| 2007/0290792 | A1* | 12/2007 | Tsuchimochi ...... | B60R 25/2072 340/5.61 |
| 2009/0091471 | A1* | 4/2009 | Brilion ............... | G07C 9/00309 340/12.22 |
| 2010/0007463 | A1* | 1/2010 | Dingman ............. | B60Q 1/2669 340/5.72 |
| 2016/0369534 | A1* | 12/2016 | Tabata ............... | G07C 9/00944 |
| 2017/0263066 | A1* | 9/2017 | Kang ................. | G07C 9/00309 |

FOREIGN PATENT DOCUMENTS

| | | |
|---|---|---|
| JP | 2012154119 A | 8/2012 |
| JP | 6173566 B2 | 7/2017 |

* cited by examiner

DOOR LOCK SYSTEM AND HANDLE OF DOOR FOR VEHICLE

CROSS REFERENCE TO RELATED APPLICATIONS

This application is based on and claims priority under 35 U.S.C. § 119 to Japanese Patent Application 2018-216817, filed on Nov. 19, 2018, and Japanese Patent Application 2018-240513, filed on Dec. 25, 2018 the entire contents of which are incorporated herein by reference.

TECHNICAL FIELD

This disclosure generally relates to a door lock system and a handle of a door for a vehicle.

BACKGROUND DISCUSSION

A portable wireless key device (which is hereinafter referred to as a key device) is commonly used to lock and unlock a door for a vehicle, for example, at a position away from the door. Such key device includes a so-called smart key that allows a user of the vehicle, for example, to lock and unlock the door by brining his/her hand closer to a door handle of the door, touching the door, or releasing his/her hand from the door handle in a state where the user has the smart key in his/her pocket or bag, for example.

JP2012-154119A (Reference 1) discloses a door handle apparatus for a vehicle including a smart key system. The aforementioned door handle apparatus includes an onboard device (a door lock system) inside a door handle. The onboard device is electrically connected with an electronic control unit (ECU) provided at the vehicle by a first line and a second line. The onboard device includes an antenna coil that serves as a coil including an antenna function and sends, to the outside of the door handle apparatus, a response request signal to a portable device (an example of the key device). The onboard device also includes a human detection IC including a lock sensor and an unlock sensor.

The aforementioned smart key system disclosed in Reference 1, for example, utilizes the key device that is designated to the vehicle (specifically, to a vehicle door) beforehand. In view of popularization of mobile devices such as smartphones, for example, and development of car-sharing services where one car is shared by plural people, various kinds of key devices are desirable in addition to the designated key device. In this case, a door lock apparatus applicable to plural types of key devices is possibly mounted at a door handle. Nevertheless, such door lock apparatus requires increased number of circuits and antennas for the plural types of key devices and causes interference in radio communication and signal transmission of the circuits and the antennas, for example. The aforementioned interference may inhibit appropriate locking and unlocking of the door. The increased number of circuits, for example, of the door lock apparatus may complicate connection interface with the vehicle.

A need thus exists for a door lock system and a handle of a door for a vehicle which are not susceptible to the drawback mentioned above.

SUMMARY

According to an aspect of this disclosure, a door lock system includes a first circuit performing a first communication to request a response for determining availability of unlocking a door, a second circuit performing a second communication for determining availability of unlocking the door and transmitting a reception result of the second communication to an outside of the door lock system, and a control circuit controlling operations of the first circuit and the second circuit. The control circuit stops one of the first communication and the second communication from being performed in a case where the other one of the first communication and the second communication is performed.

According to another aspect of this disclosure, a handle of a door for a vehicle includes a first circuit performing a first communication to request a response for determining availability of unlocking the door, a second circuit performing a second communication for determining availability of unlocking the door and transmitting a reception result of the second communication, a control circuit controlling operations of the first circuit and the second circuit, a pair of electric wires connecting the first circuit and the control circuit in parallel with each other, and a casing housing the first circuit, the second circuit, and the control circuit. The pair of electric wires transmits the reception result of the second communication to an outside of the handle and supplying an electric power supplied from the outside to the first circuit, the second circuit, and the control circuit. The control circuit stops one of the first communication and the second communication from being performed in a state where the other one of the first communication and the second communication is performed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A door lock system and a handle of a door for a vehicle according to an embodiment are explained with reference to FIGS. 1 to 4 and 6.

Figure 1:
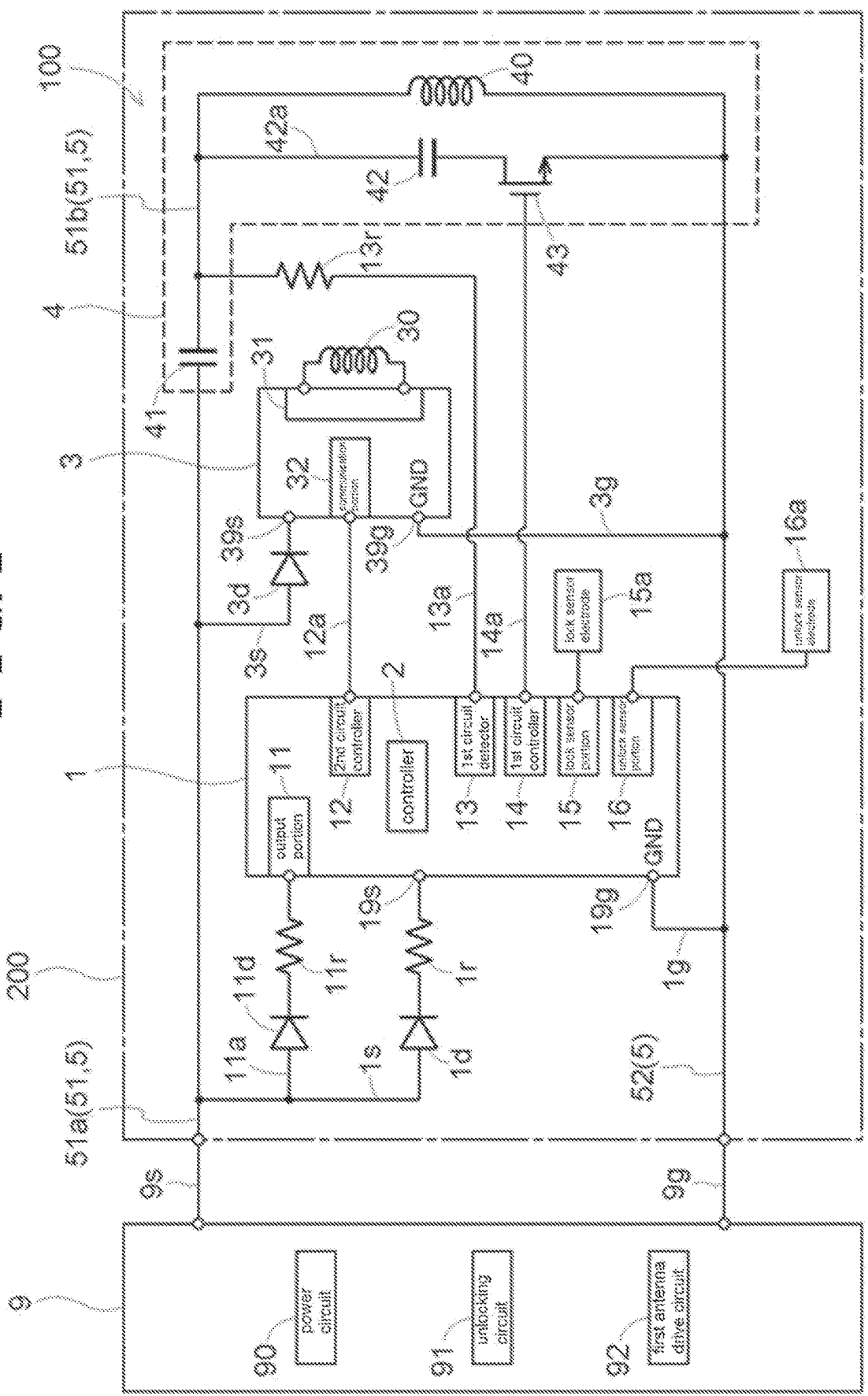
FIG. 1 is a block diagram of a door lock system mounted at a handle of a door for a vehicle according to an embodiment disclosed here.
Figure 2:
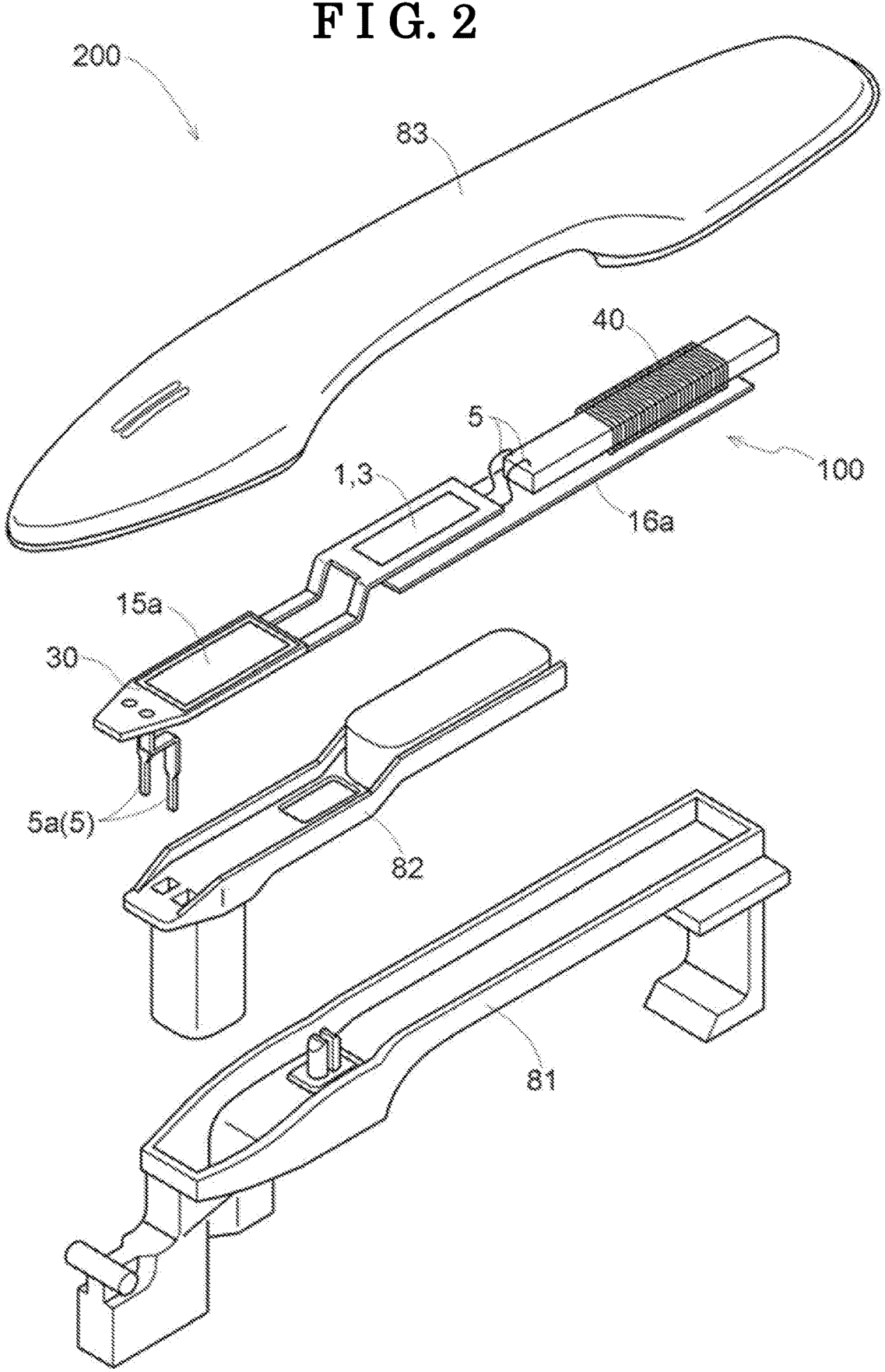
FIG. 2 is an exploded perspective view of the handle.
Figure 6:
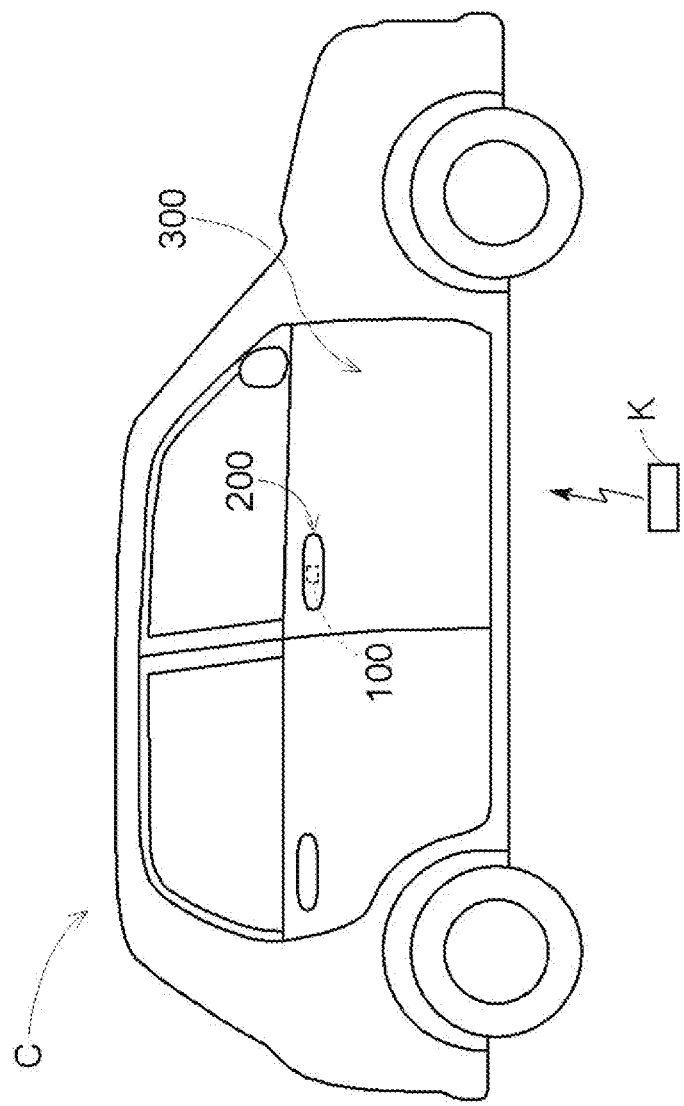
FIG. 6 is a diagram illustrating a vehicle door where the handle incorporating the door lock system is mounted.

As illustrated in FIGS. 1, 2 and 6, a door lock system 100 is incorporated at a handle 200 mounted at a door 300 for a vehicle (for example, an automobile) C. The door lock system 100 is connected to an electronic control unit (ECU) 9 mounted at the vehicle C by a pair of electric wires 9s and 9g.

The door lock system 100 includes a coil 40 serving as an example of a first antenna and a coil 30 serving as an example of a second antenna. Each of the coils 40 and 30 includes an antenna function. The door lock system 100 communicates with a key device K held by an occupant of the vehicle C or a portable electronic device such as a smartphone, for example, that functions as the key device K to request and obtain information for determining availability (adequacy) of unlocking or locking the door 300. The aforementioned information includes, for example, an identity card (ID) of the occupant of the vehicle C who is permitted to get in the vehicle C, the ID serving as an example of a reception result. The door lock system 100 also accepts a command or an instruction for opening and closing the door 300 from the occupant of the vehicle C. The door lock system 100 performs a first communication by the coil 40 to request a response from the key device or the portable electronic device functioning as the key device for determining availability of unlocking and locking the door 300. The door lock system 100 also performs a second communication by the coil 30 to request a response from the key device or the portable electronic device functioning as the key device for determining availability of unlocking and locking the door 300. In the following, the information for determining availability of unlocking and locking the door 300 may be simply referred to as determination information. In addition, the key device and the portable electronic device functioning as the key device as mentioned above may be comprehensively called the key device. In the following, the first communication and the second communication in a case where the door lock system 100 unlocks the door 300 are mainly explained. Such explanation is also applicable to a case where the door lock system 100 locks the door 300.

The second communication is achievable in an area closer to the door lock system 100 than an area where the first communication is achievable by the key device K.

The ECU 9 corresponds to or partially corresponds to a central control unit of the vehicle C including the handle 200 that incorporates the door lock system 100. The ECU 9 includes a power circuit 90, an unlocking circuit 91, and a first antenna drive circuit 92. Each of the circuits according to the present embodiment includes a general configuration, not a specific configuration. That is, the circuit includes a configuration where plural electronic components are mounted on a single board and a configuration where an integrated circuit (IC) at which plural functions of electronic components are gathered (i.e., electronic components are integrated on one chip).

The power circuit 90 serves as a power supply device that supplies an electric power to the door lock system 100 that is driven accordingly. The power circuit 90 supplies direct-current power through the electric wire 9s. The electric wire 9g is grounded.

The unlocking circuit 91 acquires information used for determining availability of unlocking the door 300 and information related to an input of an instruction for unlocking the door 300, for example, through amplitude of a current value of the electric wire 9s. The unlocking circuit 91 determines availability of unlocking the door 300 and sends an instruction for unlocking the door 300 to an unlocking device provided at the door 300, for example, based on the aforementioned acquired information.

The first antenna drive circuit 92 is a drive circuit that drives the coil 40 functioning as an antenna. The first antenna drive circuit 92 supplies coded alternating current to the electric wire 9g so that the coil 40 transmits a predetermined signal (for example, a communication request signal or a response request signal to the key device K).

As illustrated in FIG. 1, the door lock system 100 includes a first circuit 4, a second circuit 3, a control circuit 1, and a pair of electric wires 5 (specifically, electric wires 51 and 52). The first circuit 4 that includes the coil 40 is suitable for long-distance communication. The second circuit 3 that includes the coil 30 is suitable for relatively short-distance communication as compared to the first circuit 4. The control circuit 1 includes an unlock sensor portion 16 that serves as an example of a proximity sensor and accepts an input of a door unlock instruction from the occupant of the vehicle C, and a lock sensor portion 15 that serves as an example of a proximity sensor and accepts an input of a door locking instruction from the occupant of the vehicle C. The proximity sensor detects approach and separation of the body of the occupant (for example, the hand of the occupant). The control circuit 1 includes a controller 2 that controls an operation of the door lock system 100 in accordance with operations of the first circuit 4, the second circuit 3, the lock sensor portion 15, and the unlock sensor portion 16. The electric wires 51 and 52 are connected to the electric wires 9s and 9g respectively.

The first circuit 4 performs wireless communication (specifically, transmission) through radio waves with the key device (for example, a wireless key device accompanied with the vehicle C, i.e., sold together with the vehicle C) serving as a first key device held by the occupant of the vehicle C. The first circuit 4 communicates with the key device in communication system suitable for long distance communication. In the present embodiment, the first circuit 4 performs wireless communication (so-called LF communication) where the response request signal that is encoded by amplitude modulation is transmitted by broadcasting, for example, in a so-called LF band (including frequencies from 30 kHz to 300 kHz). Such communication performed by the first circuit 4 serves as an example of the first communication. In the following, the transmission of the response request signal performed by the first circuit 4 in the door lock system 100 may be simply referred to as communication. In a case of Bluetooth (registered name) serving as the other long-distance communication than LF communication, Bluetooth communication may include transmission and reception of a signal, for example.

The first circuit 4 includes the coil 40 including the antenna function, a first capacitor 41 connected in series with the coil 40, a second capacitor 42 connected in parallel with the coil 40, and a switch 43 connected in series with the second capacitor 42.

The first capacitor 41 is arranged at the electric wire 51. The first capacitor 41 is a DC block circuit (i.e., a coupling capacitor). The first capacitor 41 enables an alternating current sent from the first antenna drive circuit 92 of the ECU 9 to be supplied (bypassed) to the coil 40 and blocks direct current component of current from the electric wire 51 from being supplied to the coil 40. The first capacitor 41 constitutes an LC serial resonance circuit together with the coil 40. The LC serial resonance circuit resonates with frequency of alternating current sent from the first antenna drive circuit 92 of the ECU 9 in accordance with adjustment of capacitance of the first capacitor 41. The coil 40 thus appropriately performs wireless communication (i.e., wireless transmission of the signal).

The coil 40 is a wound wire including the antenna function in the LF band. The coil 40 includes a first end connected to the electric wire 51 and a second end connected to the electric wire 52. In the following, a part of the electric wire 51 arranged between the coil 40 and the first capacitor 41 is referred to as an electric wire 51b and a remaining part of the electric wire 51 is referred to as an electric wire 51a.

The second capacitor 42 and the switch 43 are arranged at an electric wire 42a that is connected to the electric wires 51b and 52. In the present embodiment, the second capacitor 42 is provided closer to the electric wire 51b than the switch 43. The second capacitor 42 constitutes, together with the coil 40, an LC parallel circuit serving as a first antenna circuit and an example of an LC circuit in a state where the switch 43 is short-circuited (i.e., closed). The second capacitor 42 fails to constitute, together with the coil 40, the LC parallel circuit in a case where the switch 43 is opened (i.e., conduction is blocked). The switch 43 is selectively opened and closed in accordance with an instruction from the control circuit 1. The switch 43 corresponds to a field-effect transistor, an insulated gate bipolar transistor, and a device or a contact configuration including switch function, for example.

In a case where the LC parallel circuit is established with the switch 43 being short-circuited, the first circuit 4 fails to perform the communication. In a case where the switch 43 is opened to inhibit the second capacitor 42 from being connected to the coil 40, the establishment of the LC parallel circuit is released. The first circuit 4 is thus able to perform the communication.

The key device that receives the response request signal from the first circuit 4 transmits information including a first specific ID (which is hereinafter called a first response communication) to the vehicle C. In the present embodiment, the vehicle C includes an antenna separately provided from the coils 40 and 30, the antenna being configured to receive the first response communication. The unlocking circuit 91 obtains information including the first specific ID through the first response communication. The unlocking circuit 91 waits for receiving an unlocking instruction from the unlock sensor portion 16 in a case of determining availability of unlocking. The unlocking circuit 91 holds its state when determining that unlocking is not available (i.e., not adequate).

The second circuit 3 performs wireless communication through radio waves with a key device different from that accompanied with the vehicle C, i.e., a smartphone, for example, serving as a second key device held by the occupant of the vehicle C and storing ID information registered for the vehicle C beforehand. In the embodiment, the second circuit 3 communicates with the key device in communication system suitable for short distance communication. The second circuit 3 communicates in the communication system that achieves individual recognition function by wireless communication, specifically, radio frequency identification (RFID), for example. In the present embodiment, the second circuit 3 performs short-distance wireless communication called near field communication (NFC). The second circuit 3 obtains the determination information by receiving a response signal (i.e., a signal including ID, for example) from the key device. Such communication serves as an example of the second communication. The second circuit 3 performs communication in accordance with an operation instruction by the controller 2.

The second circuit 3 includes the coil 30, a second antenna drive circuit 31 that drives the coil 30, and a communication portion 32 that transmits a signal included in a radio signal received by the coil 30 to the control circuit 1 and receives an instruction related to an operation of the second circuit 3 from the control circuit 1. The second circuit 3 includes a power terminal 39s that is connected to the electric wire 51a by an electric wire 3s including a diode 3d so as to receive power supply. The diode 3d is connected to the electric wire 51a at an anode side. The second circuit 3 includes a ground terminal 39g that is connected to the electric wire 52 by an electric wire 3g so as to be grounded. The control circuit 1 is connected in parallel to the first circuit 4 and the coil 40 thereof relative to the pair of electric wires 5.

The coil 30 is constituted by a wound wire including an NFC antenna function. In the present embodiment, the coil 30 is the wound wire as an example to achieve the NFC antenna function. Instead of the wound wire, the NFC antenna function is achievable by a conductive pattern printed on a board.

The second antenna drive circuit 31 is provided for the NFC. The second antenna drive circuit 31 drives the coil 30 to perform the NFC. The second antenna drive circuit 31 is configured to detect a device that differs from the key device accompanied with the vehicle C and performs the NFC (in the embodiment, a key device configured to perform the NFC) within a communication available area of the second circuit 3 in accordance with a change in impedance of the coil 30. When such detection is achieved, the second antenna drive circuit 31, specifically, the second circuit 3, performs the NFC communication.

The communication portion 32 is communicably connected to the control circuit 1 by a signal line 12a. The communication portion 32 that receives the operation instruction from the control circuit 1 through communication therewith brings the second antenna drive circuit 31 to perform the communication in response to the received operation instruction. With the second antenna drive circuit 31 performing the communication, the communication portion 32 acquires the signal included in the radio signal that is received by the coil 30. The communication portion 32 drives the second antenna drive circuit 31 in response to the operation instruction acquired from the control circuit 1 and causes the coil 30 to transmit a predetermined signal. In the present embodiment, the second antenna drive circuit 31 demodulates the signal included in the radio signal that is received by the coil 30 and thereafter sends the demodulated signal to the communication portion 32.

In the aforementioned construction, the first circuit 4 is configured to perform the first communication to request a response to the first key device for determining availability of unlocking the door 300. The first communication is a one-way communication (i.e., transmission) from the first circuit 4 to the first key device. The first communication includes broadcast communication. The second circuit 3 is configured to perform the second communication with the second key device. The second communication is a two-way communication including a communication (i.e., transmission) to request a response to the second key device for determining availability of unlocking the door 300 and a reception of the response. The second circuit 3 transmits the reception result including information for determining availability of unlocking the door 300 to the outside (for example, to the ECU 9 of the vehicle C). The door lock system 100 is applicable to plural key devices accordingly.

The control circuit 1 including the controller 2 controls operations of the first circuit 4 and the second circuit 3. The control circuit 1 includes a second circuit controller 12, a first circuit detector 13, a first circuit controller 14, the lock sensor portion 15, the unlock sensor portion 16, and an output portion 11. The second circuit controller 12 controls the second circuit 3 by communicating therewith and acquires a signal from the second circuit 3. The first circuit detector 13 monitors an operation state of the first circuit 4. The first circuit controller 14 controls on/off of the switch 43. The lock sensor portion 15 includes a lock sensor electrode 15a that detects a locking instruction input from the occupant of the vehicle C and sends out the locking instruction acquired from the lock sensor electrode 15a to the ECU 9. The unlock sensor portion 16 includes an unlock sensor electrode 16a and detecting an unlocking instruction input from the occupant of the vehicle C. Each of the lock sensor electrode 15a and the unlock sensor electrode 16 serves as an example of an electrode. The unlock sensor portion 16 sends out the unlocking instruction acquired from the unlock sensor electrode 16a to the ECU 9.

The control circuit 1 includes a power terminal 19s that is connected to the electric wire 51a by an electric wire 1s including a diode 1d and a resistance 1r so as to be supplied with power. The diode 1d is connected to the electric wire 51a at an anode side. The control circuit 1 includes a ground terminal 19g that is connected to the electric wire 52 by an electric wire 1g so as to be grounded. The output portion 11 of the control circuit 1 is connected, by an electric wire 11a including a diode 11d and a resistance 11r, to a part of the electric wire 1s positioned closer to the electric wire 51a than the diode 1d. The diode 11d is connected to the electric wire 1s at an anode side.

The output portion 11 is a circuit that converts (encodes) a signal output from each of the second circuit controller 12, the lock sensor portion 15, and the unlock sensor portion 16 of the control circuit 1, for example, into amplitude of current which is then transmitted to the ECU 9. The signal from the aforementioned each part of the control circuit 1 is output to the ECU 9 via the output portion 11.

The first circuit detector 13 is connected to the electric wire 51b by an electric wire 13a including a resistance 13r. The first circuit detector 13 detects a voltage (a magnitude of peak voltage) of the electric wire 51b and sends the detection result to the controller 2. The controller 2 determines whether the first circuit 4 is performing the communication (i.e., transmitting the signal) while being driven by the ECU 9 based on the detection result of the first circuit detector 13. In the present embodiment, it is determined that the first circuit 4 is performing the communication in a case where the aforementioned peak voltage is greater than a predetermined value.

The second circuit controller 12 receives a signal including the determination information from the communication portion 32 and transmits an instruction related to an operation of the second circuit 3 (for example, permission and prohibition of communication) to the second circuit 3 in response to the operation instruction from the controller 2. The second circuit controller 12 transmits a signal including the determination information to the unlocking circuit 91. The unlocking circuit 91 unlocks the door 300 without waiting for receiving the unlocking instruction from the unlock sensor portion 16 in a case of receiving the signal including the determination information and determining that unlocking is acceptable. The unlocking circuit 91 holds its state when it is determined that unlocking is not acceptable.

Each of the lock sensor electrode 15a and the unlock sensor electrode 16a is a capacitance proximity sensor, for example. The lock sensor portion 15 and the unlock sensor portion 16 send the locking instruction and the unlocking instruction respectively to the ECU 9 in a state where the lock sensor electrode 15a and the unlock sensor electrode 16a detect approach of the occupant to the door 300 (the handle 200). The aforementioned approach of the occupant includes contact of the occupant to the door 300 (the handle 200) according to the embodiment.

The first circuit controller 14 opens and closes the switch 43 in response to the instruction of the controller 2. The first circuit controller 14 and the switch 43 are communicably connected to each other by a signal line 14a.

The controller 2 is a central processing unit (CPU) of the control circuit 1, for example, and serves as a central controlling portion controlling operations of the first circuit 4 and the second circuit 3.

The controller 2 is configured to stop the communication performed by one of the first circuit 4 and the second circuit 3 while the other one of the first circuit 4 and the second circuit 3 is performing the communication.

An example of an operation of the door lock system according to the embodiment is explained. The door lock system 100 illustrated in FIG. 1 is explained below.

The controller 2 causes the second circuit 3 to perform the communication at timing, i.e., during a time period, where the ECU 9 inhibits the first circuit 4 from performing the communication in accordance with the detection result of the first circuit detector 13. The controller 2 stops the communication performed by the first circuit 4 when bringing the second circuit 3 to perform the communication. That is, the controller 2 prioritizes the communication performed by the second circuit 3.

To stop the communication performed by the first circuit 4, the controller 2 instructs the first circuit controller 14 to short-circuit the switch 43 so as to constitute the LC parallel circuit. The first circuit 4 is inhibited from performing the communication accordingly.

The ECU 9 repeatedly and alternately allows and stops the communication performed by the first circuit 4 at predetermined timing.

The controller 2 opens the switch 43 during a communication (transmission) time where the first circuit 4 performs the communication. The controller 2 may previously inform the ECU 9 of the opening of the switch 43 so that the ECU 9 causes the first circuit 4 to perform communication (transmission of the signal) based on the aforementioned information.

The controller 2 short-circuits the switch 43 in a state where the ECU 9 stops the communication performed by the first circuit 4. The LC parallel circuit is thus obtained at the first circuit 4 so that the first circuit 4 is inhibited from performing the communication. The controller 2 maintains the first circuit 4 in non-communicable (inoperative) state for a predetermined time period and then opens the switch 43 to allow the first circuit 4 to perform the communication.

The controller 2 allows the second circuit 3 to perform the communication in a state where the ECU 9 stops the communication performed by the first circuit 4 and the first circuit 4 is brought in the non-communicable state. The second circuit 3 detects whether a key device that is communicable with the second circuit 3 is positioned in a communicable area of the second circuit 3. When such key device is detected, the second circuit 3 performs the communication to obtain the determination information that is then sent to the ECU 9. The second circuit 3 stops its communication when the communication is prohibited by the controller 2. Permitting or prohibiting the communication performed by the second circuit 3 by the controller 2 may be informed to the ECU 9. Such information may cause the ECU 9 to wait or resume the communication performed by the first circuit 4.

The handle 200 illustrated in FIG. 2, for example, is mounted at the door 300 for the vehicle C. The handle 200 includes a first base portion 81 at which the door lock system 100 is mounted, a second base portion 82, and a casing 83. The second base portion 82 is fitted and fixed to the first base portion 81 to partially support a board provided at the door lock system 100. The casing 83 houses the second base portion 82 and the door lock system 100 to cover an outer side thereof.

The handle 200 includes a first longitudinal end at which the coil 30 and the lock sensor electrode 15*a* of the door lock system 100 are arranged and a second longitudinal end at which the coil 40 and the unlock sensor electrode 16*a* of the door lock system 100 are arranged. The pair of electric wires 5 of the door lock system 100 includes a pair of connection terminals 5*a* provided at the first longitudinal end of the handle 200. The door lock system 100 is connected to the ECU 9 of the vehicle C via the connection terminals 5*a*.

Figure 3:
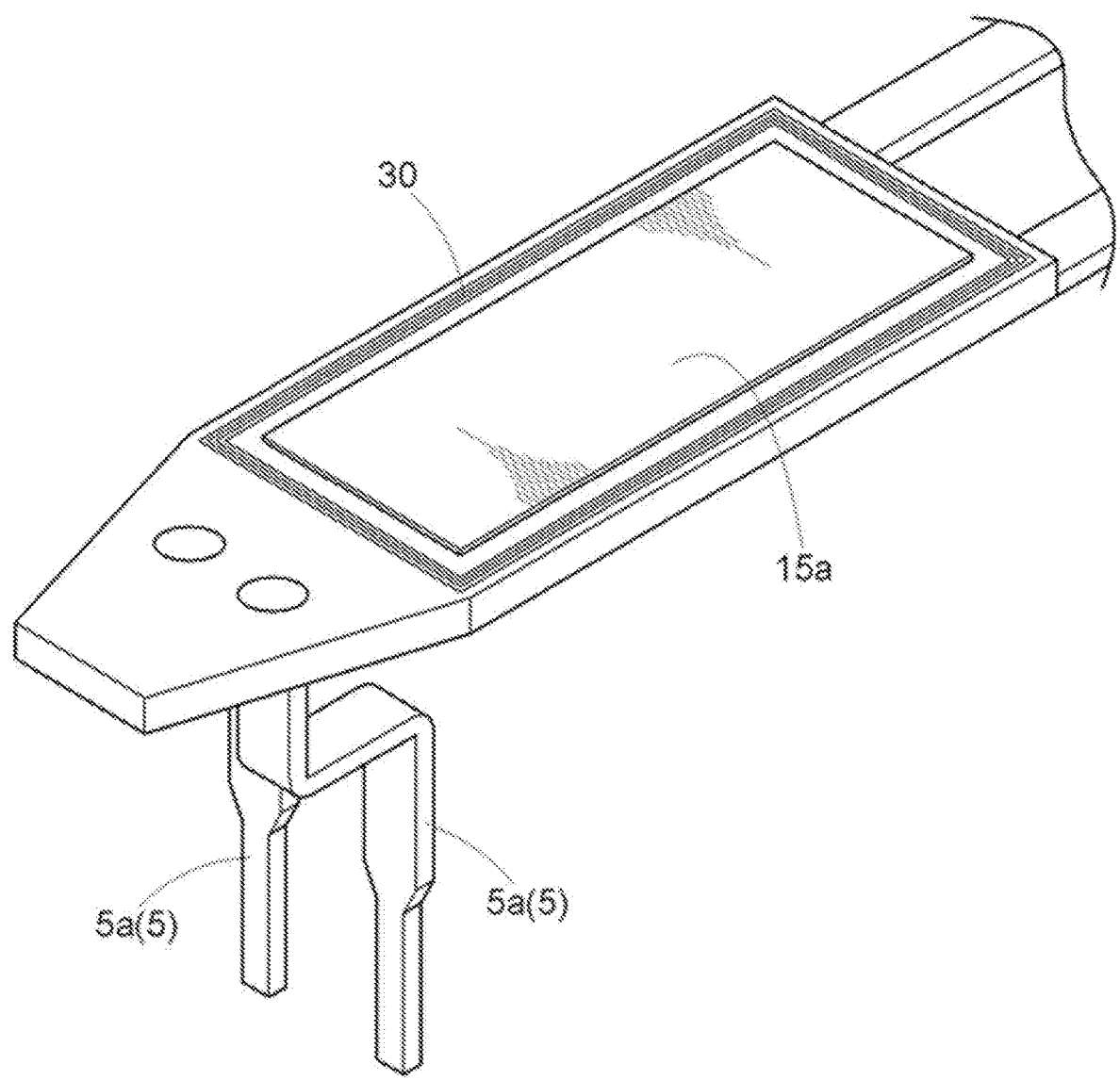
FIG. 3 is a partially enlarged view of a lock sensor and a second antenna of the handle.

As illustrated in FIG. 3, the coil 30 is arranged along an outer circumference of an electrode plate of the lock sensor electrode 15*a* in a flat form so as to surround the electrode plate. The coil 30 is arranged adjacent to the lock sensor electrode 15*a*. The coil 30 is provided as an electrode pattern on a support board of the lock sensor electrode 15*a*.

The door lock system and the handle of the door for a vehicle applicable to various kinds of key devices and including simple interface are thus provided.

In the aforementioned embodiment, the controller 2 stops the communication performed one of the first circuit 4 and the second circuit 3 while the other one of the first circuit 4 and the second circuit 3 is performing the communication. The controller 2 may further stop detections performed by the lock sensor electrode 15*a* and the unlock sensor electrode 16*a* of the lock sensor portion 15 and the unlock sensor portion 16 in a state where the second circuit 3 performs the communication.

For example, the controller 2 may stop the detection performed by the lock sensor electrode 15*a* of the lock sensor portion 15 while allowing the communication performed by the second circuit 3. In particular, the controller 2 may stop the detection performed by the lock sensor electrode 15*a* of the lock sensor portion 15 in a case where the second antenna drive circuit 31 detects the key device communicable with the second circuit 3 at the communicable area of the second circuit 3. The second circuit 3 and the key device may securely communicate with each other accordingly. The lock sensor electrode 15*a* of the lock sensor portion 15 may stop detection by a disconnection between the lock sensor portion 15 and the lock sensor electrode 15*a* or by a connection of the lock sensor electrode 15*a* to the ground. The above is also applicable to the unlock sensor portion 16 and the unlock sensor electrode 16*a*.

In the embodiment, the second circuit 3 performs the NFC communication. Alternatively, the second circuit 3 may perform other short-distance wireless communication than the NFC communication.

In the embodiment, each of the lock sensor electrode 15*a* and the unlock sensor electrode 16*a* is a capacitance proximity sensor, for example. The lock sensor portion 15 and the unlock sensor portion 16 send the locking instruction and the unlocking instruction to the ECU 9 in a case where the lock sensor electrode 15*a* and the unlock sensor electrode 16*a* detect the occupant coming closer thereto. In a case of detecting the occupant coming closer, each of the lock sensor portion 15 and the unlock sensor portion 16 may distinguish between contact (second proximity distance) and approach excluding contact (first proximity distance) relative to the handle 200 so as to recognize the contact and the approach excluding the contact as different operation instructions from each other.

For example, in a case where the approach excluding the contact is detected by the unlock sensor portion 16, the controller 2 may prohibit the communication performed by the second circuit 3. The controller 2 may permit the communication from the second circuit 3 in a case where the contact is detected by the unlock sensor portion 16. In a case where the occupant holding the key device is positioned near the vehicle by chance so that the second circuit 3 is communicating with the key device and the unlocking circuit 91 is waiting for receiving the unlocking instruction from the unlock sensor portion 16, the door 300 is inhibited from being opened by the other person not holding the key device but being positioned closer to the unlock sensor electrode 16*a*. The door 300 is inhibited from being opened regardless of an intension of the occupant holding the key device accordingly.

In a case where the approach excluding the contact is detected by the lock sensor portion 15, the controller 2 may permit the communication performed by the second circuit 3 (i.e., permit the second communication). The controller 2 may prohibit the communication performed by the second circuit 3 (i.e., stop the communication performed by the second circuit 3) in a case where the contact is detected by the lock sensor portion 15. In this case, the second circuit 3 performs the communication in a state where the key device is confirmed as being positioned near the vehicle so that the approach of the key device is detected by the lock sensor portion 15. Instead of the lock sensor portion 15, the aforementioned construction is applicable to the unlock sensor portion 16.

In the embodiment, the first circuit 4 includes the switch 43. Alternatively, the control circuit 1 may incorporate the switch 43.

Figure 4:
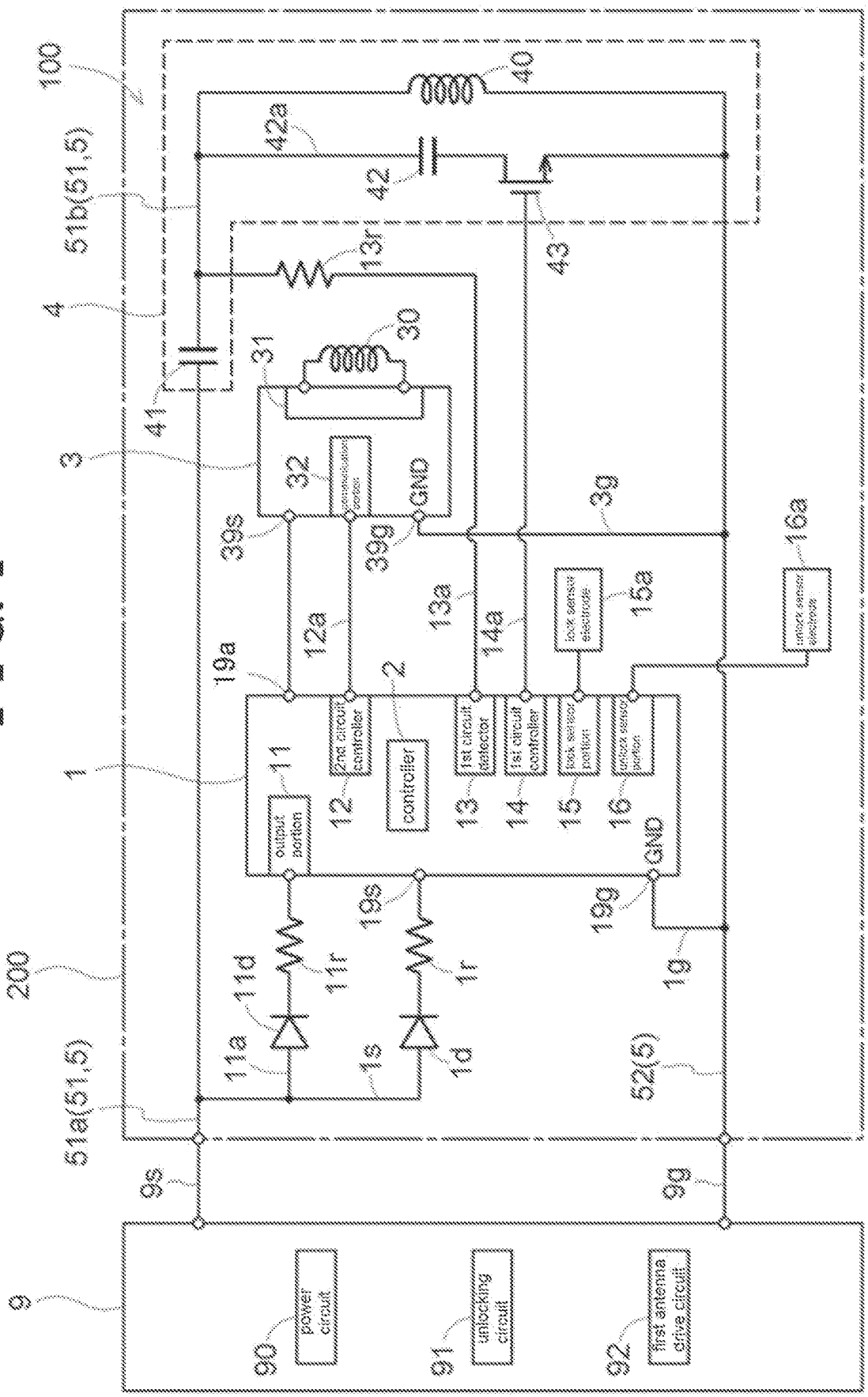
FIG. 4 is a block diagram of the door lock system mounted at the handle according to a modified example.

In the embodiment, the second circuit 3 includes the power terminal 39*s* that is connected to the electric wire 51*a* by the electric wire 3*s* including the diode 3*d* so as to be supplied with power. Alternatively, the second circuit 3 may be supplied with power from the control circuit 1 as illustrated in FIG. 4. In this case, the control circuit 1 includes an output terminal 19*a* that outputs an electric current of which voltage is adjusted by a regulator, for example. The second circuit 3 is supplied with power in a state where the power terminal 39*s* and the output terminal 19*a* are connected to each other.

In the embodiment, the first capacitor 41 and the coil 40 of the first circuit 4 together constitute the LC serial resonance circuit. The first circuit 4 may additionally include a damping resistance serially connected to the first capacitor 41 and the coil 40. The damping resistance causes early damping of electric charge accumulated at the LC serial resonance circuit to make resonance of the LC serial resonance circuit to be sharpened.

In the embodiment, the door lock system 100 includes the first circuit 4 performing the LF communication and the second circuit 3 performing the short-distance wireless communication such as the NFC, for example. The door lock system 100 may additionally include a communication circuit in other communication system (for example, Bluetooth). The door lock system 100 may include three or more than three communication circuits including the first circuit 4, the second circuit 3, and other communication circuit(s).

In the embodiment, the first circuit 4 includes the coil 40 including the antenna function, the first capacitor 41 connected in series with the coil 40, the second capacitor 42 connected in parallel with the coil 40, and the switch 43 connected in series with the second capacitor 42. In a case of stopping the communication performed by the first circuit 4, the controller 2 constitutes the LC parallel circuit by instructing the first circuit controller 14 to short-circuit the switch 43. The first circuit 4 is thus inhibited from performing the communication. Instead of the second capacitor 42 and the switch 43, a second switch connected in series with the coil 40 may be employed. In this case, the first circuit 4 is inhibited from performing the communication by the opened second switch in a case where the controller 2 stops the communication performed by the first circuit 4.

In the present embodiment, the first circuit 4 includes the coil 40 including the antenna function, the first capacitor 41 connected in series with the coil 40, the second capacitor 42 connected in parallel with the coil 40, and the switch 43 connected in series with the second capacitor 42. In a case of allowing the communication performed by the first circuit 4, the controller 2 transmits the radio signal using resonance of the LC serial circuit by instructing the first circuit controller 14 to open the switch 43. In addition, in a case of allowing the communication performed by the second circuit 3, the controller 2 constitutes the LC parallel circuit by instructing the first circuit controller 14 to short-circuit the switch 43 to bring the first circuit 4 in the non-communicable state. The second circuit 3 performs the short-distance wireless communication called NFC and the first circuit 41 performs the LF communication. In a case where the second circuit 3 performs the NFC, the single coil 30 achieves transmission and reception of the signal (i.e., achieves a two-way communication). On the other hand, in a case where the first circuit 4 performs the LF communication, the single coil 40 is impossible to perform transmission and reception of the signal (i.e., performs a one-way communication). In the present embodiment, another antenna is provided separately from the coil 40 and the coil 30 so as to receive the first response communication from the key device. Alternatively, in a case where the controller 2 constitutes the LC parallel circuit by short-circuiting the switch 43, the coil 40 may function as a reception coil configured to receive a radio signal using resonance of the LC parallel circuit to receive the first response communication from the key device. In this case, the controller 2 brings the switch 43 to be short-circuited to stop the transmission performed by the first circuit 4 and causes the first circuit 4 to function as a reception circuit relative to the key device and causes the second circuit 3 to transmit and receive the signal. An additional antenna besides the coils 40 and 30 is not required, which leads to the door lock system with simple construction.

Figure 5:
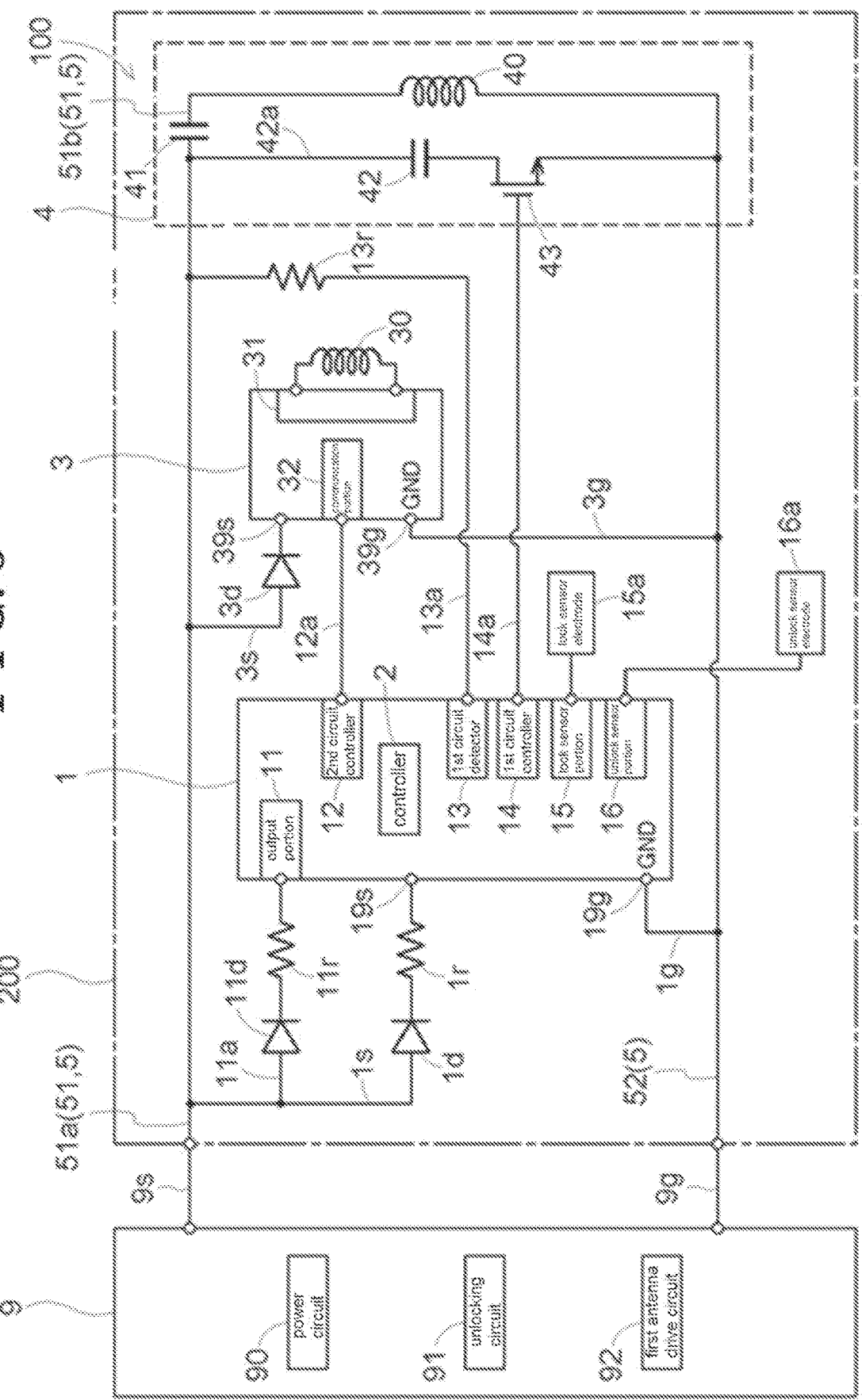
FIG. 5 is block diagram of the door lock system mounted at the handle according to another modified example.

In the embodiment, the first circuit 4 includes the coil 40 including the antenna function, the first capacitor 41 connected in series with the coil 40, the second capacitor 42 connected in parallel with the coil 40, and the switch 43 connected in series with the coil 40. Alternatively, as illustrated in FIG. 5, the first circuit may include the coil 40 including the antenna function, the first capacitor 41 connected in series with the coil 40, the second capacitor 42 connected in parallel with the serial connection between the coil 40 and the first capacitor 41, and the switch 43 connected in series with the second capacitor 42.

The aforementioned embodiment and examples may be appropriately combined with one another. In addition, the constructions of the embodiment and examples are appropriately changed or modified.

According to the embodiment, a door lock system 100 includes a first circuit 4 performing a first communication to request a response for determining availability of unlocking a door 300, a second circuit 3 performing a second communication for determining availability of unlocking the door 300 and transmitting a reception result of the second communication to an outside of the door lock system 100, and a control circuit 1 controlling operations of the first circuit 4 and the second circuit 3. The control circuit 1 stops one of the first communication and the second communication from being performed in a case where the other one of the first communication and the second communication is performed.

According to the aforementioned construction, the control circuit 1 stops one of the first communication and the second communication from being performed in a case where the other one of the first communication and the second communication is performed. Thus, one of the first circuit and the second circuit is inhibited from suffering from interference (noise) while the other one of the first circuit and the second circuit is performing the communication. The first communication and the second communication are appropriately obtainable, which causes the door lock system 100 to be applicable to plural key devices. Such inhibition of interference achieves simple interface between the door lock system 100 and the outside (for example, an ECU 9 of a vehicle C). For example, the first circuit and the second circuit are inhibited from having different signal lines from each other.

In the embodiment, the first circuit 4 is configured to perform the first communication in wireless communication. The second circuit 3 is configured to perform the second communication in wireless communication. The first circuit 4 performs relatively longer-distance wireless communication than the second circuit 3.

According to the aforementioned construction, the first circuit 4 performs the relatively longer-distance wireless communication than the second circuit 3. For example, the communication with a key device positioned at a relatively longer distance from the door lock system 100 is performed by the first circuit 4 as the first communication. The communication with a key device positioned at a relatively closer distance is performed by the second circuit 3 as the second communication. While the second communication is being performed with the key device at a relatively closer distance, the first communication is stopped from being performed. Thus, in a case where an occupant of the vehicle C holding the key device comes closer to the door lock system 100, the second communication is appropriately performed to unlock the door 300.

In the embodiment, the control circuit 1 stops the first communication from being performed in a case where the second communication is performed.

Accordingly, the second communication is given priority by the stop of the first communication. In addition, the first communication is inhibited from starting to block the second communication in a state where the second communication is being performed.

In the embodiment, the control circuit 1 brings the first circuit 4 to an inoperative state in a case where the second communication is performed.

Accordingly, the first communication is stopped in a state where the first circuit 4 is specified to be inoperative. The second communication is given priority accordingly. In addition, the first circuit 4 is specified to be inoperative so as not to perform the first communication while the second communication is being performed. The first communication is thus inhibited from being started to block the second communication in a state where the second communication is being performed.

In the embodiment, the first circuit 4 includes a first antenna circuit for wireless communication. The control circuit 1 interrupts the first antenna circuit in a case where the second communication is performed.

According to the aforementioned construction, the first antenna circuit is interrupted so that the first circuit 4 is inhibited from performing the first communication. The second communication is given priority accordingly. In addition, the second communication is inhibited from being interrupted.

In the embodiment, the first circuit 4 includes a first antenna circuit for wireless communication. The control circuit 1 switches the first antenna circuit to a reception circuit in a case where the second communication is performed.

According to the aforementioned construction, the first antenna circuit is switched to the reception circuit so that the first circuit 4 is inhibited from requesting the response, i.e., performing the first communication. The second communication is given priority accordingly. In addition, the second communication is inhibited from being interrupted.

In the embodiment, the first antenna circuit includes a first antenna including a coil 40, a capacitor 42, and a switch 43 connected in series with the capacitor 42. The coil 40, the capacitor 42, and the switch 43 are connected in parallel with the control circuit 1. The control circuit 1 short-circuits the switch 43 to constitute an LC circuit including the coil 40 and the capacitor 42 in a case where the second communication is performed.

The LC circuit is configured at the first antenna circuit by the short-circuit of the switch 43. The control circuit 1 causes the switch 43 to be short-circuited so that the first circuit 4 is inhibited from performing the first communication.

In the embodiment, the door lock system 100 further includes a sensor portion (proximity sensor) 15, 16 configured to input one of an unlocking instruction and a locking instruction relative to the door 300. The second circuit 3 includes a coil (second antenna) 30 for wireless communication. The proximity sensor 15, 16 includes an electrode 15a, 16a that detects one of the unlocking instruction and the locking instruction. The second antenna 30 is arranged adjacent to an outer circumference of the electrode 15a.

In a case where it is determined beforehand that unlocking of the door 300 is available through communication with a key device held by an occupant of the vehicle C, the occupant holding the key device makes the unlocking instruction to the door 300 via the electrode 15a, 16a of the sensor portion 15, 16. In the same manner, in a case where it is determined beforehand that locking of the door 300 is available through communication with the key device held by the occupant, the occupant holding the key device makes the locking instruction to the door 300 via the electrode 15a, 16a of the sensor portion 15, 16.

Because the coil 30 is arranged adjacent to the outer circumference of the proximity sensor 15, the coil 30 and the electrode 15a of the sensor portion 15 are arranged in a compact manner. Specifically, in a case where the first circuit 4 performs the relatively longer distance wireless communication than the second circuit 3, the second circuit 3 including the coil 30 performs relatively shorter distance wireless communication. At this time, because the coil 30 is arranged adjacent to the outer circumference of the electrode 15a of the sensor portion 15, the unlocking instruction or the locking instruction are made by the electrode 15a of the sensor portion 15 at the same time or immediately after the determination of availability of unlocking or locking the door 300 by a key device positioned at a short distance from the door lock system 100. Usability of the door lock system 100 and security may improve accordingly.

In the embodiment, the sensor portion 15, 16 is configured to distinguish between a first proximity distance and a second proximity distance that is closer to the sensor portion 15, 16 than the first proximity distance. The control circuit 1 enables the second communication to be performed in a case of detecting the first proximity distance and stops the second communication from being performed in a case of detecting the second proximity distance.

Accordingly, the second proximity distance corresponding to a contact with the sensor portion 15, 16, for example, and the first proximity distance that is close to the sensor portion 15, 16 so as to be detectable thereby but farther than the second proximity distance are distinguishable from each other. The second communication is performed while the occupant holding the key device is confirmed, the occupant being positioned at the first proximity distance that is close to the sensor portion 15, 16 so as to be detectable thereby but not as close as contacting the sensor portion 15, 16. At this time, the occupant may input the unlocking instruction or the locking instruction by making contact with the sensor portion 15, 16.

In the embodiment, the control circuit 1 stops an operation of the sensor portion 15, 16 in a case where the second communication is performed.

The second communication is thus inhibited from being interfered by the electrode of the proximity sensor. The second communication is appropriately performed.

According to the embodiment, a handle 200 of a door 300 for a vehicle C includes a first circuit 4 performing a first communication to request a response for determining availability of unlocking the door 300, a second circuit 3 performing a second communication for determining availability of unlocking the door 300 and transmitting a reception result of the second communication, a control circuit 1 controlling operations of the first circuit 4 and the second circuit 3, a pair of electric wires 51, 52 connecting the first circuit 4 and the control circuit 1 in parallel with each other, and a casing 83 housing the first circuit 4, the second circuit 3, and the control circuit 1. The pair of electric wires 51, 52 transmits the reception result of the second communication to an outside of the handle 200 and supplying an electric power supplied from the outside to the first circuit 4, the second circuit 3, and the control circuit 1. The control circuit 1 stops one of the first communication and the second communication from being performed in a state where the other one of the first communication and the second communication is performed.

According to the aforementioned construction, the control circuit 1 stops one of the first communication and the second communication from being performed in a case where the other one of the first communication and the second communication is performed. Thus, one of the first circuit 4 and the second circuit 3 is inhibited from suffering from interference (noise) while the other one of the first circuit 4 and the second circuit 3 is performing the communication. The first communication and the second communication are appropriately obtainable. Such inhibition of interference achieves simple interface relative to the outside (for example, an ECU 9 of a vehicle C). For example, the first circuit 4 and the second circuit 3 are inhibited from having different signal lines from each other. In a state where the first circuit 4, the second circuit 3, and the control circuit 1 are housed in the casing 83, the pair of electric wires 51, 52 supplies the electric power to the first circuit 4, the second circuit 3, and the control circuit 1 and transmits the reception result of the second communication to the outside. Thus, interface between the outside of the handle 200 and the first circuit 4, the second circuit 3, and the control circuit 1 are simplified.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A door lock system comprising:
a first circuit performing a first communication to request a response for determining availability of unlocking a door;
a second circuit performing a second communication for determining availability of unlocking the door and transmitting a reception result of the second communication to an outside of the door lock system; and
a control circuit controlling operations of the first circuit and the second circuit,
the control circuit stopping one of the first communication and the second communication from being performed in a case where the other one of the first communication and the second communication is performed, wherein
the first circuit includes a first antenna circuit for wireless communication,
the control circuit interrupts the first antenna circuit in a case where the second communication is performed,
the first antenna circuit includes a first antenna including a coil, a capacitor, and a switch connected in series with the capacitor,
the coil, the capacitor, and the switch are connected in parallel with the control circuit, the first antenna circuit configured to function as a reception circuit when the switch is short-circuited,
the control circuit short-circuits the switch to constitute an LC circuit including the coil and the capacitor in a case where the second communication is performed.

2. The door lock system according to claim 1, wherein
the first circuit is configured to perform the first communication in wireless communication,
the second circuit is configured to perform the second communication in wireless communication,
the first circuit performs relatively longer-distance wireless communication than the second circuit.

3. The door lock system according to claim 2, wherein the control circuit stops the first communication from being performed in a case where the second communication is performed.

4. The door lock system according to claim 1, wherein the control circuit brings the first circuit to an inoperative state in a case where the second communication is performed.

5. The door lock system according to claim 1, further comprising a proximity sensor configured to input one of an unlocking instruction and a locking instruction relative to the door, wherein
the second circuit includes a second antenna for wireless communication,
the proximity sensor includes an electrode that detects one of the unlocking instruction and the locking instruction,
the second antenna is arranged adjacent to an outer circumference of the electrode.

6. The door lock system according to claim 5, wherein the proximity sensor is configured to distinguish between a first proximity distance and a second proximity distance that is closer to the proximity sensor than the first proximity distance,
the control circuit enables the second communication to be performed in a case of detecting the first proximity distance and stops the second communication from being performed in a case of detecting the second proximity distance.

7. The door lock system according to claim 5, wherein the control circuit stops an operation of the proximity sensor in a case where the second communication is performed.

8. A handle of a door for a vehicle, comprising:
a first circuit performing a first communication to request a response for determining availability of unlocking the door;
a second circuit performing a second communication for determining availability of unlocking the door and transmitting a reception result of the second communication;
a control circuit controlling operations of the first circuit and the second circuit;
a pair of electric wires connecting the first circuit and the control circuit in parallel with each other; and
a casing housing the first circuit, the second circuit, and the control circuit,
the pair of electric wires transmitting the reception result of the second communication to an outside of the handle and supplying an electric power supplied from the outside to the first circuit, the second circuit, and the control circuit,
the control circuit stopping one of the first communication and the second communication from being performed in a state where the other one of the first communication and the second communication is performed, wherein
the first circuit includes a first antenna circuit for wireless communication,
the control circuit interrupts the first antenna circuit in a case where the second communication is performed,
the first antenna circuit includes a first antenna including a coil, a capacitor, and a switch connected in series with the capacitor,
the coil, the capacitor, and the switch are connected in parallel with the control circuit, the first antenna circuit configured to function as a reception circuit when the switch is short-circuited,
the control circuit short-circuits the switch to constitute an LC circuit including the coil and the capacitor in a case where the second communication is performed.

9. A door lock system comprising:
a first circuit performing a first communication to request a response for determining availability of unlocking a door;
a second circuit performing a second communication for determining availability of unlocking the door and transmitting a reception result of the second communication to an outside of the door lock system; and
a control circuit controlling operations of the first circuit and the second circuit,
the control circuit stopping one of the first communication and the second communication from being performed in a case where the other one of the first communication and the second communication is performed, wherein the first circuit includes a first antenna circuit for wireless communication, the control circuit interrupts the first antenna circuit in a case where the second communication is performed, the first antenna circuit includes a first antenna including a coil, a first capacitor, a second capacitor, and a switch connected in series with the second capacitor, the switch and the second capacitor are connected in parallel with the coil, the first capacitor is connected in series with the control circuit, the coil, the second capacitor, and the switch are connected in parallel with the control circuit, the control circuit short-circuits the switch to constitute an LC circuit including the coil and the second capacitor in a case where the second communication is performed.

* * * * *